Nov. 19, 1935.  A. E. HEDLUND  2,021,182
HYDRAULIC CLUTCH AND POWER TRANSMISSION
Filed April 26, 1933  3 Sheets-Sheet 1
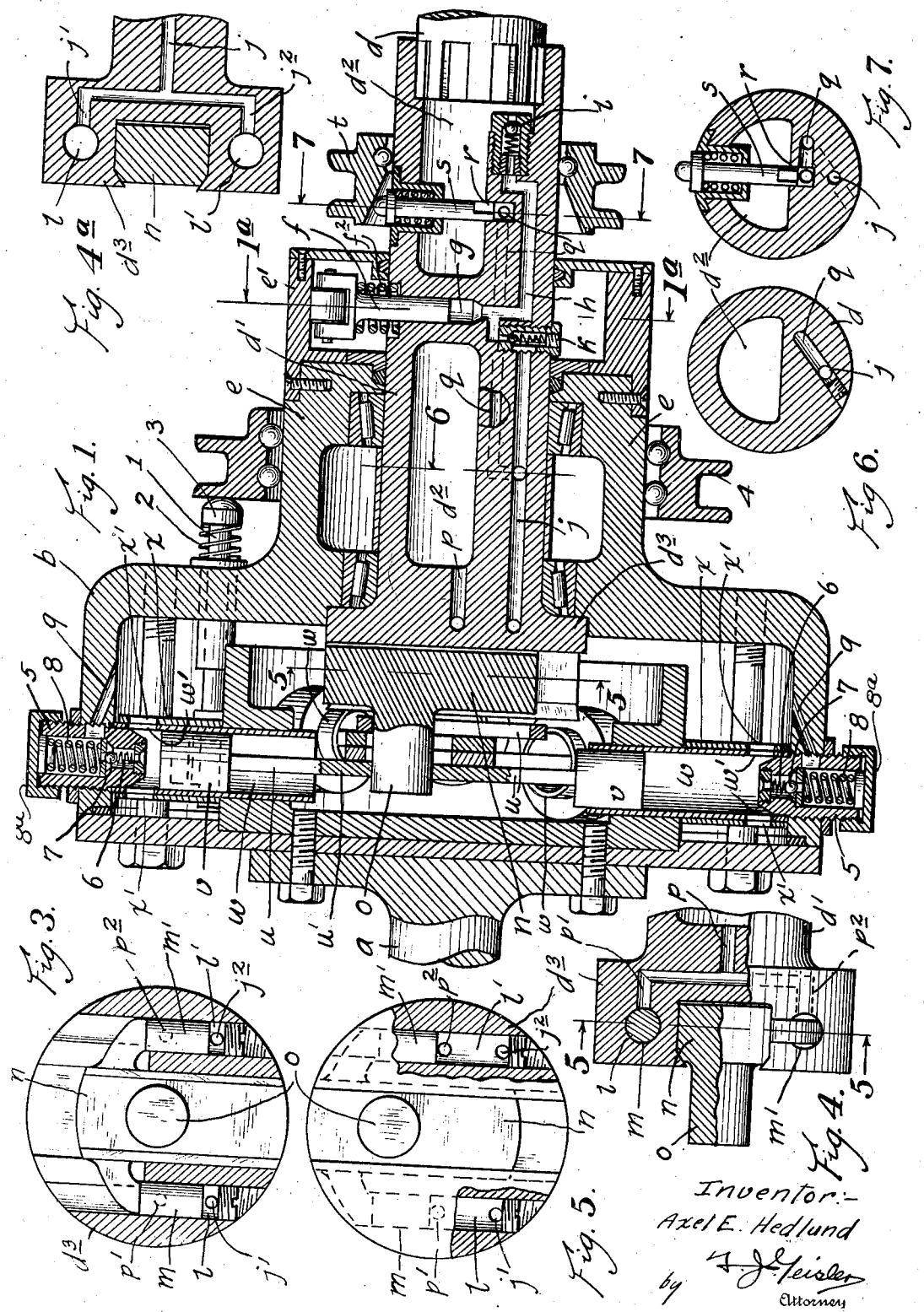
Inventor:-
Axel E. Hedlund
by
Attorney Nov. 19, 1935.  A. E. HEDLUND  2,021,182
HYDRAULIC CLUTCH AND POWER TRANSMISSION
Filed April 26, 1933  3 Sheets-Sheet 2
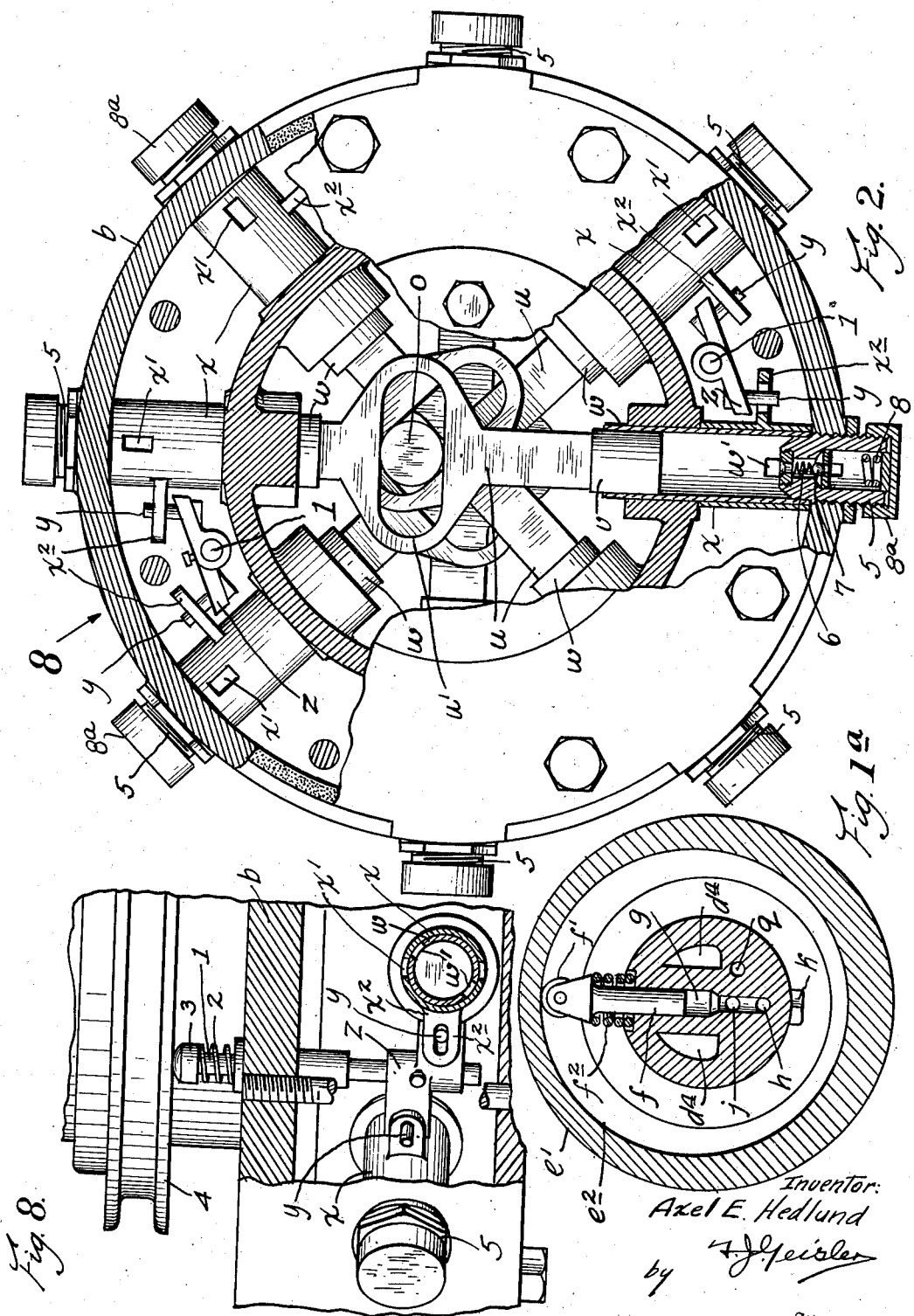
Inventor:
Axel E. Hedlund
by H. J. Geisler
Attorney

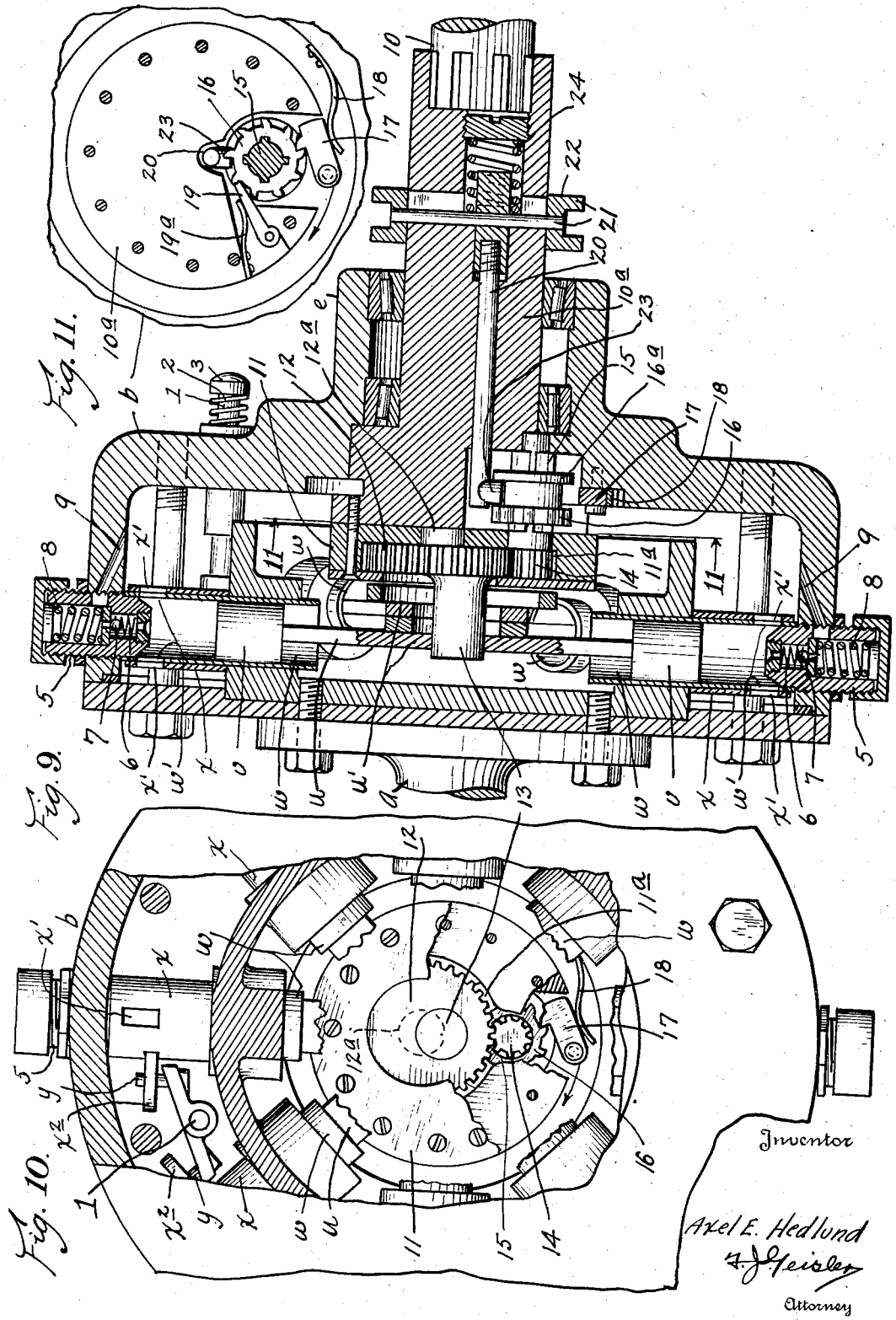

Patented Nov. 19, 1935

2,021,182

UNITED STATES PATENT OFFICE 2,021,182

HYDRAULIC CLUTCH AND POWER TRANSMISSION

Axel E. Hedlund, Everett, Wash.

Application April 26, 1933, Serial No. 668,021

4 Claims. (Cl. 192—60)

My invention relates specifically to hydraulic clutches in engines of the automotive type, altho my clutch has other uses.

The particular type of hydraulic clutch to which I refer comprises a hollow fly wheel carried by the driving shaft, within the chamber of which fly wheel are provided a series of hydraulically controlled connections between said fly wheel and the crank pin of the driven shaft. Said connections consist of a series of hydraulic cylinders radial with the center of rotation of the fly wheel. These cylinders have ports located adjacent the interior periphery of the fly wheel. In said cylinders reciprocate pistons, which are connected to the crank pin of the driven shaft, and the ports of said cylinders are controlled by manually operated valves.

The operation of said prior type of clutch in brief is as follows:

The fly wheel is partly filled with a liquid, preferably oil, which due to centrifugal force when the fly wheel is in rotation forms a circular body on the interior periphery of the fly wheel's chamber. The oil will then cover and tend to pass in and out of the ports of the cylinders. Since the pistons are connected to the crank pin of the driven shaft, they will be reciprocated while said ports are open; but when the valves controlling said cylinders are partly closed, and the passage of the oil into and out of the cylinders is correspondingly obstructed and retarded, then the driven shaft will be given some rotation from the fly wheel, because the flow of the oil thru said ports is too slow to permit the free reciprocation of the pistons within the cylinders. Then when said ports are entirely closed, the resulting hydraulic pressure will prevent the pistons from reciprocating at all, whereupon the rotation of the fly wheel will be transmitted in the nature of a direct drive to the driven shaft.

The objections which I have found, to the use of said hydraulic clutch is that free wheeling— so essential to the modern motor of the automotive type—is interfered with, due to the fixed character of the crank pin carried by the driven shaft; for, since the crank pin is fixed said pistons will continue to work even when the engine is idling; and such continuous operation of the pistons imposes too much resistance and prevents free wheeling. Besides, in case more or less heavy oil is used in the chamber of the fly wheel, low atmospheric temperatures would tend to render the oil too viscous, and thus too slow to move in and out of the cylinders' ports, and the pistons would exercise a drag on the engine.

The object of my invention is to eliminate said objections.

I attain my object by making the crank pin of the driven shaft radially movable, so that it may be alined with the center, or axis of rotation of the driven shaft, thus placed in a neutral or inactive position, or projected into, and held in eccentric, and thus active position, by means under the control of the operator of the engine.

The advantage of my invention is that while the crank pin is in its inactive position, thus alined, as mentioned, with the center of rotation of the driven shaft, said pistons will remain at rest, and the fly wheel will thus be permitted to idle freely.

The means provided by me for controlling the position of the crank pin are also preferably hydraulic. In the further description of my invention, I will refer to these means, for convenience, as the crank pin control; and will refer to the means for controlling the ports of said cylinders, and thus the reciprocation of their pistons, as the clutch control.

My crank pin control is so contrived that when manually applied it will function to project and hold the crank pin in its eccentric, active position. And when my crank pin control is thrown into its active position, it will transmit the full speed of rotation of the fly wheel to the driven shaft.

A further feature of my invention is the cylinders of the fly wheel clutch are provided with safety valves, so as to prevent any injury due to overloading the motor. By my arrangement the resisting pressure exerted against the movement of the pistons may be limited, so that in case of overload, tending to impose excessive strain on the operative connections between the fly wheel and the driven shaft, any pressure greater than the allowed maximum is dissipated thru said safety valves.

A further object of my invention is to provide a hydraulic clutch of the character described embodying simplicity of construction and operation, with the parts so arranged as to avoid excessive wear and tear.

The above described features of my invention are hereinafter fully described with reference to the accompanying drawings, in which:

Fig. 1 shows one entire embodiment of my invention in the form of a central, longitudinal vertical section of the driving shaft, the fly wheel thereby carried and the driven shaft;

Fig. 1a shows a section on the line 1a—1a of Fig. 1;

Fig. 2 shows an elevation of the fly wheel looking at the left end of Fig. 1, the fly wheel being dismounted from the driving shaft and parts of the case of the fly wheel broken away so as to show the interior hydraulic pump elements;

Fig. 3 shows a front elevation of the head of the driven shaft with its sliding wrist pin;

Fig. 4 shows a top view of the head of the driven shaft partly in plan section;

Fig. 4a shows a plan section taken thru the ports $p'$, $p2$ of the head of the driven shaft; compare Figs. 3, 5 and 4;

Fig. 5 shows a section taken on the line 5—5 of Fig. 1 and Fig. 4;

Fig. 6 shows a section on the line 6—6 of Fig. 1;

Fig. 7 shows a section on the line 7—7 of Fig. 1;

Fig. 8 shows a fragmentary sectional exterior view of the fly wheel as shown by Fig. 2, looking at the latter in the direction pointed by the arrow 8;

Fig. 9 shows a modification of my device; the wrist pin in this instance being eccentrically mounted on a rotatable disk, the disk being rotated by a pinion;

Fig. 10 shows a sectional elevation of the front end of the embodiment of my invention as shown in Fig. 9, with parts broken away to disclose the interior elements; and Fig. 11 shows a section taken on the line 11—11 of Fig. 9.

$a$ is the crank or driving shaft of the motor. On it is mounted a hollow fly wheel $b$.

The fly wheel clutch

Within the chamber of the fly wheel are provided a series of radially disposed hydraulic cylinders $w$, in which reciprocate pistons $v$. Opposite pistons $v$, are connected by a bar $u$ having a centrally located slotted head $u'$, in which bears the radially movable crank pin $o$ of the driven shaft $d$.

Hence, when said crank pin is in its eccentric, active position then the rotation of the fly wheel $b$ will cause the pistons $v$, to be reciprocated, due to the resistance of the crank pin. But when the latter is in its inoperative position, that is, alined with the center of rotation of the driven shaft $d$, then the pistons will not be reciprocated.

Crank pin control

The crank pin $o$ is projected into its eccentric, active position by the hydraulic means provided in the chambered extension $d'$ of the driven shaft $d$. Said extension of the driven shaft is provided with an oil chamber $d2$.

In the chambered extension $e'$ of the hub $e$ of the fly wheel $b$ is located a pump $f$, operating in a cylinder $g$. The two parts of the chamber $d2$ are connected by passageways $d4$ extending around the pump as shown by Fig. 1a.

The oil flows from the right end of the chamber $d2$ thru a check valve $i$, into oil duct $h$, and from thence into the pump cylinder $g$.

The pump $f$ is moved in one direction by the expansion spring $f2$. The extension $e'$ of the hub of the fly wheel is provided with an eccentric chamber $e2$ (see Fig. 1a) in which travels the wheel $f'$ of the pump $f$. Hence, while the hub $e$ of the fly wheel rotates about the driven shaft extension $d'$, the pump will be operated.

The oil under pressure of the pump $f$ flows from the pump cylinder $g$ thru a check valve $k$ into the oil duct $j$, and from thence thru the latter's lateral branches $j'$, $j2$ (see Fig. 4a) into the lower end ports of the cylinders $l$, $l'$, in which reciprocate pistons $m$, $m'$. These pistons carry a slide $n$ having the crank pin $o$.

The cylinders $l$, $l'$ are provided with return ports $p'$, $p2$ (see Fig. 4) which connect with the oil duct $p$, leading back into the chamber $d2$.

A spring controlled, manually operated valve $s$ controls the application of hydraulic pressure by the circulation of the oil in chamber $d2$ when the pump $f$ is operated. The valve $s$ is operated by a collar $t$, longitudinally slidable on the driven shaft extension $d'$ by means (not shown) under the control of the driver.

When the valve $s$ is opened the operation of the pump $f$ forces the oil thru check valve $k$ into duct $j$, and it will flow from the latter to duct $q$ and thru the valve port $r$ of the valve $s$ back into the chamber $d2$, thus making a short circuit, without acting upon the pistons $m$, $m'$. But when the valve $s$ is closed said return flow thru the duct $q$ being stopped, the oil flowing thru duct $j$ is forced thru the ports $j'$, $j2$ into the cylinders $l$, $l'$ and lifts the pistons $m$, $m'$ until the return ports $p'$, $p2$ are uncovered.

The further operation of the pump $f$ will then cause the circulation of the oil thru ports $j'$, $j2$ and $p'$, $p2$ of the cylinders $l$, $l'$ and the chamber $d2$, but under continued pressure holding the pistons $m$, $m'$ in their raised position.

When the slide $n$, with its crank pin $o$, is free to slide in the head $d3$ of the driven shaft, the pull of the pistons of the hydraulic cylinders of the fly wheel clutch will place the crank pin $o$ in alinement with the center of rotation of the driven shaft, thus in the inactive position.

The clutch control

The case of the fly wheel $b$ is partially filled with oil, and the centrifugal force engendered by the rotation of the fly wheel, will cause the oil to form itself into an annular body against the interior periphery of the fly wheel chamber.

Rotary valves $x$ having ports $x'$ control the ports $w'$ of the hydraulic cylinders $w$. The rotary valves $x$ are provided with lateral, slotted arms $x2$, in which bear pins $y$, carried by arms of the collar $z$, fast on the shank of the reciprocable rod $1$ having a head $3$ on which bears a spring $2$. On the hub $e$ of the fly wheel is slidably mounted a collar $4$, which is controlled by the operator by suitable means readily understood, therefore not shown.

During the rotation of the fly wheel the ports $w'$ of the hydraulic cylinders $w$ will be covered by said body of oil within the fly wheel; but, of course, so long as the valves $x$ remain closed, the pistons $v$, will not be reciprocated.

By moving the collar $4$ to the left against the the head $3$ of the rod $1$, the collar $z$ is so moved as to cause its pins $y$, $y$ to rock the valves $x$, and thus close the ports $w'$ of the hydraulic cylinders, partially or entirely.

The hub $e$ of the fly wheel $b$ is mounted by roller bearings on the driven shaft extension $d'$ as shown in Fig. 1.

In order to prevent overloading of the motor, and thus imposing excessive strain on the operative connections between the fly wheel and the driven shaft, I provide the hydraulic cylinders $w$ with safety valves $7$, thru which excessive pressure is relieved. Each of these safety valves consists of a nipple $5$ opening into the hydraulic cylinder $w$, and connected with the interior of the passage $9$ of the fly wheel $b$ (see Figs. 1 and 9).

The inlet thru the nipple 5 is controlled by a valve element 7 composed of a disc having a central hole, and a ball normally seated on and closing said hole. The ball is held seated on said disk by spring 6; and the said disc is normally held in closed position by a spring 8, thus normally preventing the passage of pressure from the cylinder w into the chamber of the fly wheel. The resistance of the valve 7 to such pressure is adjustable by the adjustment of the tension of the spring 8 by the cap 8a. When the pressure in the cylinder w is greater than that of the resistance of said spring 8, it is relieved by passing from the cylinder back into the chamber of the fly wheel.

A possible variation of the means for moving the crank pin of the driven shaft into and out of its active position is illustrated in Figs. 9, 10 and 11.

Referring to the latter figures: b designates the fly wheel, and e its hub; 10 designates the driven shaft, and 10a its extension on which the hub e of the fly wheel is rotatably mounted. To the head of the driven shaft extension 10a is secured a plate 11 provided with an annular recess 11a, in which is rotatably mounted a gear 12 which carries the crank shaft 13. The gear 12 is provided with a pin 12a, the center of which is eccentrically disposed with respect to the center of rotation of the driven shaft 10, in order to move the crank pin 13 in an orbit which will place it in and out of its active position.

A pinion 14 rigid on a shaft 15 meshes with the gear 12. A ratchet pinion 16 is slidably mounted on the shaft 15, and in one position is engaged with a pawl 17 controlled by a spring 18.

A pawl 19 controlled by a spring 19a prevents the reverse rotation of the shaft 15. The ratchet pinion 16 is provided with a grooved collar 16a in which bears a lug 23 of a longitudinally slidable rod 20, connected to a sliding collar 21, and is held in inactive position by a spring 24. The sliding collar 21 is assumed to be controlled by a quandrant and lever device, not shown; thus by moving the collar 21 against the spring 24, the ratchet pinion 16 is brought into engagement with the pawl 17 and the pinion 14 is rotated, thereby rotating the gear 12, and placing the crank pin 13 in its active, eccentric position, until the sliding collar 21 is again released.

The devices above described are to be understood as merely representing an embodiment of my invention in accordance with its purposed principle of operation.

I claim:

1. In a hydraulic clutch, the combination of a driving member including a fly-wheel having a hollow rim constituting a hydraulic chamber, and a series of cylinders diametrically alined in pairs, said cylinders provided with ports open to said rim chamber, pistons lineally connected in pairs reciprocating in said cylinders, manual valves controlling said ports, operable to control the latter and thus to restrain circulation of the fluid and thereby reciprocation of said pistons; a rotatable driven member provided with a movable crank-pin; each pair of pistons being centrally, operatively connected to said crank-pin; said crank-pin in one position coinciding with the axes of rotation of said fly wheel and said driven member, and in another position being located eccentrically with said axes, in its eccentric position effecting a power transmitting connection between said driving and said driven members, and in its other position permitting the pistons to remain at rest with no transmission of power from said driving member to said driven member; and manually controlled hydraulic means for moving said crank-pin into and out of its said two positions.

2. The combination described by claim 1 with the manually controlled hydraulic means for moving the crank-pin including a chamber holding liquid, a reciprocable element carrying said crank-pin operated by pressure in such chamber, and a pump element for producing such pressure.

3. The combination described by claim 1 with the manually controlled means for moving the crank-pin including a chamber holding liquid, a reciprocable element carrying said crank-pin operated by pressure in such chamber, and a pump element for producing such pressure, said pump element operated by the rotation of said fly wheel.

4. The combination described by claim 1 with the manually controlled hydraulic means for moving the crank-pin including a chamber holding liquid, a reciprocable element carrying said crank-pin operated by pressure in such chamber, a pump element for producing such pressure, such pump element operated by the rotation of said fly wheel, the liquid normally circulating in said chamber, and manual means for arresting such circulation and thus causing pressure in said chamber.

AXEL E. HEDLUND.